UNITED STATES PATENT OFFICE.

FREDERICK JAMES HARRISON, OF NOTTING HILL, COUNTY OF MIDDLESEX, ENGLAND.

CLEANSING COMPOUND OR SOAP.

SPECIFICATION forming part of Letters Patent No. 355,523, dated January 4, 1887.

Application filed May 26, 1885. Serial No. 166,769. (No specimens.) Patented in England December 23, 1884, No. 16,847.

*To all whom it may concern:*

Be it known that I, FREDERICK JAMES HARRISON, a subject of the Queen of Great Britain, residing at Latimer Road, Notting Hill, in the county of Middlesex, England, builder, have invented a new and useful Composition of Matter for a Cleansing Compound, of which the following is a specification.

My compound consists in improved proportions and manner of treating certain materials well known as ingredients of cleansing compounds, whereby an improved cleansing compound or soap is obtained possessing a valuable property for cleansing purposes not hitherto obtained in any of the compounds previously made from such ingredients.

My compound consists of the following ingredients, combined in the exact proportions stated, and prepared in the particular manner hereinafter described.

In an ordinary steam-jacketed pan is placed two tons of melted common soap, to which is added about five hundred gallons of soft water. The steam is then turned on to boil the soap and water, which is kept well stirred during boiling. Then, by degrees, is added six tons of pure alkali, and afterward as much more water as may be required for keeping the admixture about the consistency of cream. After the above ingredients have become well incorporated the steam is turned off, and as soon as the temperature of the mass has fallen below boiling-point is added eight hundred weight of muriate of ammonia, with which has been incorporated eight gallons of hydrogen peroxide. The whole is then kept well stirred until it comes to the consistency of cream, when it is run into molds to solidify, after which it is ready for use.

I would observe that I am aware that various patents have been granted for different ways of combining and treating the before-mentioned ingredients to produce a cleansing compound, and I have discovered that my special proportionate admixture of such ingredients and treatment of same produces a cleansing compound possessing a certain valuable property over and above any compound previously made from such materials; and

What I claim, and desire to secure by Letters Patent of the United States, is—

A cleansing compound composed of an admixture of common soap, pure alkali, muriate of ammonia, and hydrogen peroxide in the particular proportions mentioned, mixed and treated in the manner described.

F. J. HARRISON.

Witnesses:
   THOMAS IVES,
     9 *Southampton Buildings, London, Clerk.*
   JOHN MACDONALD,
     9 *Southampton Buildings, London, Engineer.*